(12) United States Patent
Wutthinitikornkit et al.

(10) Patent No.: US 11,952,562 B2
(45) Date of Patent: Apr. 9, 2024

(54) PROCESS OF IMPROVING THE FLAVOUR AND AROMA OF LIQUOR

(71) Applicants: Yanee Wutthinitikornkit, Bangkok (TH); Sookjai Wutthinitikornkit, Bangkok (TH); Chaiyasit Wutthinitikornkit, Bangkok (TH); Yongsheng Qiu, Bangkok (TH)

(72) Inventors: Yanee Wutthinitikornkit, Bangkok (TH); Sookjai Wutthinitikornkit, Bangkok (TH); Chaiyasit Wutthinitikornkit, Bangkok (TH); Yongsheng Qiu, Bangkok (TH)

(73) Assignee: Seawagen Company Limited, Bangkok (TH)

( * ) Notice: Subject to any disclaimer, the term of this patent is extended or adjusted under 35 U.S.C. 154(b) by 408 days.

(21) Appl. No.: 17/258,508

(22) PCT Filed: Sep. 13, 2018

(86) PCT No.: PCT/IB2018/057014
§ 371 (c)(1),
(2) Date: Jan. 7, 2021

(87) PCT Pub. No.: WO2020/026019
PCT Pub. Date: Feb. 6, 2020

(65) Prior Publication Data
US 2021/0292690 A1  Sep. 23, 2021

(30) Foreign Application Priority Data
Aug. 1, 2018 (TH) .................. 1801004535

(51) Int. Cl.
*C12G 3/04* (2019.01)
(52) U.S. Cl.
CPC ..................... *C12G 3/04* (2013.01)

(58) Field of Classification Search
CPC ... C12H 1/00; C12H 1/02; C12H 1/04; C12H 1/06; C12H 1/061; C12H 1/063; C12H 1/10; C12H 1/16; C12H 1/165
See application file for complete search history.

(56) References Cited

FOREIGN PATENT DOCUMENTS

| CN | 87101743 A | 9/1987 |
| CN | 104928142 A * | 9/2015 |

(Continued)

OTHER PUBLICATIONS

JP-2005137264-A macihne translation (Year: 2005).*

(Continued)

*Primary Examiner* — Vera Stulii
(74) *Attorney, Agent, or Firm* — Thomas | Horstemeyer, LLP

(57) ABSTRACT

The process of improving the flavour and aroma of liquor is an invention intended to mellow liquor flavours and aromas—like those of matured ones—and eliminate undesirable odours resulting from poor manufacturing process. The crux of the invention lies in a material which has unique properties and steps taken which include mixture preparation, selective optimisation of particles in liquor, separation of undesirable particles and arrangement of particles in liquor by relying on flow velocity, temperature, and electromagnetic field in controlling collision of particles in liquor. The output is liquor with rather unaltered physical appearance, ester and alcohol content, not causing irritated throat, burning stomach or nausea which results from uneven alcohol content throughout liquor's body. Besides, this process overcomes limitations of existing liquor treatment techniques; it does not bring more heavy metal residues to the output liquor or cause particles in liquor to become more volatile.

3 Claims, 1 Drawing Sheet

(56) References Cited

FOREIGN PATENT DOCUMENTS

CN        107435016 A      12/2017
JP        2005137264 A  *  6/2005

OTHER PUBLICATIONS

CN 104928142 A macihne translation (Year: 2015).*
International Search Report and Written Opinion for PCT/IB2018/057014 dated Apr. 28, 2019.
Han, Xing-lin, et al. "Investigation on the Effects of Physical Aging on the Microconsituents in Fen-flavor Liquor and the Structure of Liquor Body" Liquor-Making Science & Technology, No. 3. Mar. 31, 2009, pp. 51-53, 56.
Zhuang, Ming-yang. "The Properties & Application Theories and Approaches of Collosol in Liquors" Liquor-Making Science & Technology, No. 2. Feb. 28, 2002, pp. 27-30.

* cited by examiner

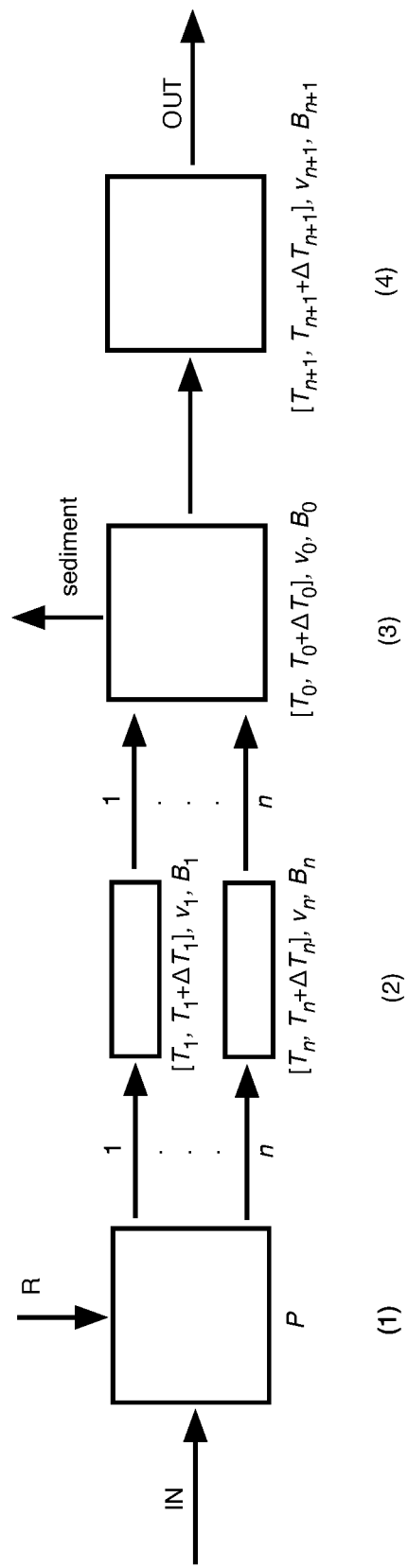

PROCESS OF IMPROVING THE FLAVOUR AND AROMA OF LIQUOR

CROSS-REFERENCE TO RELATED APPLICATION

This application is a 35 U.S.C. § 371 national phase application of PCT/IB2018/057014 filed Sep. 13, 2018 entitled "PROCESS OF IMPROVING THE FLAVOUR AND AROMA OF LIQUOR," which claims the benefit of and priority to Thailand (TH) Patent Application No. 1801004535 filed Aug. 1, 2018, the contents of both of which being incorporated by reference in their entireties herein.

TECHNICAL FIELD

This application relates to the field of food sciences and, more specifically, to technology related to liquor making.

BACKGROUND

Maturation is an important step in liquor making. Matured liquors usually have complex aromas mainly from esters. Fragrance from fatty acids incorporated in liquor becomes subtle yet distinctive and diffuses in the air when the bottle is opened. Meanwhile, stench and burning sensation from alcohol diminish. Mellow flavour and scent, harmoniously blend with sweetness from other elements in liquor resulting in meticulously sensational complex liquor. However, lengthy maturation process requires extensive storage and hence high production cost. Furthermore, undesirable odours are occasionally present due to mistakes occurring in manufacturing process, especially in distilled liquors, such as muddy or putrid smells. These drawbacks give rise to various techniques to shorten maturation process and to eliminated aforementioned undesirable odours. Listed below are existing techniques and their shortcomings.

Oxidation treatment is done by adding oxygen into liquor in a sealed container to stimulate oxidation. Its objective is to promote mellow sensation in liquor. The problem with this technique is that oxidation rate is uncontrollable and, as a result, the liquor becomes excessively flabby. Besides, this technique is prone to contamination which may cause undesired odours; preventing contamination would involve a large investment.

Heat treatment employs heat to increase rates of reactions to change physical and chemical properties of liquor. An obvious downside is that considerable amounts of ingredients are also evaporated at accelerated rates.

Activated carbon treatment utilised oxygen and metal ions in carbon porous structure to accelerate maturation reactions. It is claimed that the technique reduces turbidity and unpleasant odour in liquor. Occasionally, however, liquors after activated carbon treatment contain heavy metal residues and become blackish.

BRIEF SUMMARY OF INVENTION

The present invention overcome the shortcomings of existing techniques, that is, (1) it mellows liquor flavours and aromas like those of matured ones; (2) it eliminated undesired contaminants from manufacturing failures without contributing to any unintended residues in the output liquor; (3) it diminishes burning and vomiting sensation occurring upon an abrupt influx of alcohol due to uneven alcohol content throughout liquor's body.

The present invention employs a unique edible filtration material to filter out undesired contaminants and improve liquor's structure so that particles within are arranged and blended harmoniously by means of collision and externally applied magnetic field. The invention yields liquor with mellow flavours and complex aromas favourable characteristics of matured liquor and without unpleasant odours such as muddy or rancid smells. In addition, treated liquors do not cause burning throat or vomiting stomach usually following abruptly soaring ethanol intake rate due to unevenly structured liquor's body. Amounts of liquor's main contents, such as ethanol and ester, remain in the same proportion after the treatment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 1 includes a diagram elaborating steps of the invention process and important variables to be controlled.

DETAILED DESCRIPTION

The crux of the present invention lies in the filtration material and the steps taken.

The filtration material is used for improving liquor's structure so that particles within are arranged harmoniously and consistently throughout liquor's body and for promoting precipitation of unappealing contaminant particles. The filtration material must be edible, immiscible with water, odourless and flavourless to slightly bitter. It is solid with more than 15 elements. It has molecular weight of 800-55000 Dalton.

The process of improving the flavour and aroma of liquor according to the present invention includes the steps:

1. Mixture Preparation

In this step, the filtration material mentioned above is incorporated with the liquor by applying pressure to break various particles within into smaller clusters. The objective is to increase total surface area of substances in the mixture and to allowing particles to collide in any angles while preventing depletion of contents by evaporation. The sub-steps are as follows.

1.1 Prepare the filtration material so that it becomes miscible with the liquor. The solid filtration material is mixed with water in the proportion 20-45 gram of the solid material to 250 millilitre of water. Applying pressure to incorporate the solid material and water into gel.

1.2 Adjust concentration of the filtration material obtained from the previous sub-step prior to combining with the liquor. The concentration depends on alcohol content of the liquor, e.g., for a 61-65% ABV liquor, we dilute the gel with drinking water by a factor of approximately 20.

1.3 Combine the filtration material with the liquor. We use 1 millilitre of the diluted gel filtration material per 1 kilogram of liquor. Apply pressure to break down clusters of particles in the mixture into smaller clusters.

2. Selective Optimisation of Particles in Liquor

In this step, the mixture from the previous step is divided into parts. For each part, we apply magnetic field, control temperature and flow velocity where temperature must be controlled within a range between 5-35 degree Celcius. Particles of each part will collide and react appropriately at suitable rates.

3. Separation of Undesirable Particles

In this step, each part of the output from the previous step is placed in a same container in which magnetic field, temperature and flow velocity are controlled. Undesirable contaminant particles, which may not be visible to naked eye, will congregate and precipitate. At this point, the sediment may be filtered out from the rest of the liquor.

4. Arrangement of Particles in Liquor

After filtration, in a controlled temperature and flow velocity condition, we apply magnetic field to induce consistent arrangement of particles within the liquor so as to prevent them from overly evaporating and to reduce damage to the body from receiving ethanol at abruptly increasing rate.

The process of improving the flavour and aroma of liquor according to the present invention induces consistent arrangement of particles throughout liquor's body. Liquors after the process are characterised by mellow flavours and aromas without unpleasant odours, such as muddy or rancid smells, or heavy metal contaminants from any material used in the process, while their physical appearance, alcohol and ester contents remain unaltered.

The process of improving the flavour and aroma of liquor according to the present invention may be modified and altered within the scope of the invention.

The invention claimed is:

1. A process of improving the flavour and aroma of liquor, said process comprising:
   a. Mixture preparation, wherein said mixture comprises a gel composed of water and a solid filtration material which is edible, odourless, solid, having molecular weight between 800-55000 Dalton, and immiscible with water, wherein the mixture preparation comprising:
      mixing the solid filtration material with water in a proportion 20-45 gram of the solid material to 250 millilitre of water, and applying pressure to incorporate the solid filtration material and water into the gel;
      diluting the gel with the drinking water by a factor of approximately 20 to adjust concentration of the solid filtration material into the gel;
      mixing 1 millilitre of the diluted gel filtration material in 1 kilogram of liquor and applying pressure to break down clusters of particles into smaller clusters;
   b. Selective optimisation of particles in liquor comprises at least controlling of temperature, flow velocity and applying magnetic field in order to cause collision and reactions of particles in liquor in separate parts, wherein the temperature is in a range between 5 and 35 degree Celsius;
   c. Separation of undesirable particles comprises controlling of temperature, flow velocity and applying magnetic field in order to cause precipitation of undesirable particles, wherein the undesirable particles are filtered out from the liquor;
   d. Arrangement of particles in liquor comprises controlling of temperature, flow velocity and applying magnetic field in order to induce consistent arrangement of particles within the liquor so as to prevent them from overly evaporating and to reduce damage to the body from receiving ethanol at abruptly increasing rate.

2. The process of improving the flavour and aroma of liquor according to claim 1, wherein mixture preparation involves adjusting concentration of the gel depending on alcohol content of the liquor.

3. The process of improving the flavour and aroma of liquor according to claim 1, wherein mixture preparation involves applying pressure to break down clusters of particles into smaller clusters in order to increase total surface area of substances in the mixture and to allowing particles to collide in various angles.

* * * * *